(12) United States Patent
Wall et al.

(10) Patent No.: US 11,567,459 B2
(45) Date of Patent: *Jan. 31, 2023

(54) MULTI-VARIABLE FLEET OPTIMISATION METHOD AND SYSTEM

(71) Applicant: ROLLS-ROYCE plc, London (GB)

(72) Inventors: Derek S Wall, Derby (GB); Chana T Goldberg, Derby (GB); Panagiotis Laskaridis, Derby (GB); Devaiah K Nalianda, Derby (GB)

(73) Assignee: ROLLS-ROYCE PLC, London (GB)

( * ) Notice: Subject to any disclaimer, the term of this patent is extended or adjusted under 35 U.S.C. 154(b) by 690 days.

This patent is subject to a terminal disclaimer.

(21) Appl. No.: 16/580,463

(22) Filed: Sep. 24, 2019

(65) Prior Publication Data
US 2020/0103834 A1 Apr. 2, 2020

(30) Foreign Application Priority Data
Oct. 1, 2018 (GB) ...................................... 1815998

(51) Int. Cl.
*G05B 13/02* (2006.01)
*F02C 6/20* (2006.01)
(Continued)

(52) U.S. Cl.
CPC ............ *G05B 13/024* (2013.01); *F02C 6/206* (2013.01); *F02C 9/285* (2013.01); *G08G 5/003* (2013.01)

(58) Field of Classification Search
CPC ........ G05B 13/024; F02C 6/206; F02C 9/285; F02C 9/00; G08G 5/003; F05D 2240/40;
(Continued)

(56) References Cited

U.S. PATENT DOCUMENTS 9,221,548 B1 12/2015 Sishtla et al.
2013/0323012 A1 12/2013 Dong et al.
(Continued)

FOREIGN PATENT DOCUMENTS

EP 2 434 127 A2 3/2012
GB 2503159 A 12/2013

OTHER PUBLICATIONS

Oct. 7, 2019 Search Report issued in European Patent Application No. 19 19 6493.
(Continued)

*Primary Examiner* — Bhavesh V Amin
(74) *Attorney, Agent, or Firm* — Oliff PLC

(57) ABSTRACT

A method of optimizing the operation of a fleet of gas turbine engines is provided. The method comprises the steps of: (a) measuring respective values for plural control actuator settings within each of the gas turbine engines; (b) deriving, based on data external to the operation of the gas turbine engines, a desired performance modification of the gas turbine engines; (c) determining, based on the measured control actuator settings, one or more respective trim signals for varying selected of the control actuator settings to achieve the desired performance modification; and (d) transmitting the trim signals to respective electronic controllers of the engines to vary the selected control actuator settings accordingly.

14 Claims, 5 Drawing Sheets

(51) Int. Cl.
*F02C 9/28* (2006.01)
*G08G 5/00* (2006.01)

(58) Field of Classification Search
CPC ..... F05D 2270/20; Y02T 50/60; G06Q 10/04; G06Q 10/06
See application file for complete search history.

(56) References Cited

U.S. PATENT DOCUMENTS

| | | |
|---|---|---|
| 2014/0064915 A1 | 3/2014 | Masson et al. |
| 2015/0184549 A1 | 7/2015 | Pamujula et al. |
| 2016/0258361 A1 | 9/2016 | Tiwari et al. |
| 2017/0121027 A1 | 5/2017 | Visser et al. |
| 2017/0131687 A1 | 5/2017 | Mercier-Calvairac |
| 2020/0103314 A1* | 4/2020 | Wall .......................... F02C 9/00 |
| 2020/0103834 A1* | 4/2020 | Wall ........................ F02C 6/206 |

OTHER PUBLICATIONS

Search Report of the Intellectual Property Office of the United Kingdom for GB1815998.8 with search date of Mar. 27, 2019.

* cited by examiner

MULTI-VARIABLE FLEET OPTIMISATION METHOD AND SYSTEM

CROSS-REFERENCE TO RELATED APPLICATIONS

This specification is based upon and claims the benefit of priority from United Kingdom patent application number GB 1815998.8 filed on Oct. 1, 2018, the entire contents of which are incorporated herein by reference.

BACKGROUND

Field of the Disclosure

The present disclosure relates to a method and system of optimizing the operation of a plurality of gas turbine engines.

Description of the Related Art

Conventional gas turbine engines typically contain only a few control actuator settings. For example, some gas turbine engines have only two types of control actuator setting: (1) fuel flow rate; and (2) the variable geometry of stators and rotors. To date, these control settings have been utilized within closed control loops to deliver the power requested by an operator of the gas turbine engine.

However, the architecture of next generation gas turbine engines is beginning to address the higher demands for certain resources and so typically have additional control actuator settings. These additional settings provide further degrees of freedom, and so contribute to increased flexibility in engine management.

United States patent application US 2016/0258361 A1 discloses a method for optimising a generation of an output level over a selected operating period by a power block that comprises multiple gas turbines for collectively generating the output level.

United States patent application US 2015/0184549 A1 discloses a control method for optimizing an operation of a power plant fleet that includes multiple operating configurations differentiated by a manner in which assets are engaged. The method involves sensing and collecting measured values of the operating parameters for the operating of each of the assets; tuning asset models so to configure a tuned asset model for each of the assets; simulating proposed operating configurations of the power plant fleet using the tuned asset models; and obtaining simulation results from each of the simulation runs, each of the simulation results including a predicted value for a performance indicator.

The present disclosure is at least partly based on a realisation that these additional degrees of freedom can be used to optimize engine operation and performance both per engine and also with respect to a fleet of engines.

SUMMARY OF THE DISCLOSURE

According to a first aspect there is provided a method of optimizing the operation of a fleet of gas turbine engines, the method comprising the steps of:

(a) measuring respective values for plural control actuator settings within each of the gas turbine engines;

(b) deriving, based on data external to the operation of the gas turbine engines, a desired performance modification of the gas turbine engines;

(c) determining, based on the measured control actuator settings, one or more trim signals for respectively varying selected of the control actuator settings to achieve the desired performance modification; and (d) transmitting the trim signals to respective electronic controllers of the engines to vary the selected control actuator settings accordingly.

The step of determining the one or more trim signals may be further based on current values of one or more engine state parameters of one or more of the gas turbine engines. For example, the engine state parameters may be one or more engine pressures, one or more engine temperatures, and/or one or more engine shaft rotational speeds.

In a second aspect, the disclosure provides a system for optimizing the operation of a fleet of gas turbine engines, the system comprising:

plural power managers local to and connected to the gas turbine engines, and configured to measure values for plural control actuator settings within each of the gas turbine engines; and a remote, fleet management computer system in communication with each of the power managers, and configured to derive, based on data external to the operation of the gas turbine engines, a desired performance modification of the gas turbine engines;

wherein either the power managers are further configured to determine or the fleet management computer system is further configured to determine, based on the measured control actuator settings, one or more trim signals for respectively varying selected of the control actuator settings to achieve the desired performance modification; and wherein the power managers are further configured to transmit the trim signals to respective electronic controllers of the engines to vary the selected control actuator settings accordingly.

Each power manager may be local to and connected to a subset of the gas turbine engines. For example, each power manager may be a part of a given aircraft and be responsible for managing the gas turbine engines of that aircraft.

The remote fleet management computer system may be a ground-based computer, for example in radio communication with the power managers.

One or more of the power managers may be further configured to measure current values of one or more engine state parameters of one or more of the gas turbine engines, and the determination of the one or more trim signals may be further based on the measured current values of the engine state parameters. For example, the engine state parameters may be one or more engine pressures, one or more engine temperatures, and/or one or more engine shaft rotational speeds.

In a third aspect, the disclosure provides a computer program comprising code for optimizing the operation of a fleet of gas turbine engines, the code, when run on a computer, causing the computer to perform a method comprising the steps of:

(a) receiving respective measured values for plural control actuator settings within each of the gas turbine engines;

(b) deriving, based on data external to the operation of the gas turbine engines, a desired performance modification of the gas turbine engines;

(c) determining, based on the measured control actuator settings, one or more trim signals for respectively varying selected of the control actuator settings to achieve the desired performance modification; and (c) transmitting the trim signals to respective electronic controllers of the engines to vary the selected control actuator settings accordingly.

The computer program of the third aspect may thus comprise code which causes the computer to perform the method of the first aspect.

The step of determining the one or more trim signals may be further based on current values of one or more engine state parameters of one or more of the gas turbine engines. For example, the engine state parameters may be one or more engine pressures, one or more engine temperatures, and/or one or more engine shaft rotational speeds.

The computer program may be stored on a computer readable medium.

The following optional features are applicable singly or in any combination with any aspect of the present disclosure.

The determination (based on the measured control actuator settings and optionally on the engine state parameters) of the one or more trim signals may be an indirect determination, in which, for example, the measured control actuator settings and optionally the engine state parameters are inputs to a model of the gas turbine engines. Open loop system models may also be adopted for the determination.

The selected control actuator settings may be just one, a subset, or all of the control actuator settings of each engine.

Typically, respective values of three or more control actuator settings are measured within each of the gas turbine engines.

The engine state parameters can also include state parameters external to the engines. For example, in the context of gas turbine engines which are parts of hybrid propulsion systems in which each gas turbine engine drives an electricity generator, which in turn powers one or more electrical motors, the engine state parameters can include electrical system parameters such as electrical power output and/or consumption.

The data external to the operation of the gas turbine engines may include data indicative of at least one of: a flight logistics plan for an aircraft including at least one of the gas turbine engines; an availability of service personnel; an availability of maintenance equipment; a service interval time of at least one of the gas turbine engines; and an availability of consumables for the fleet of gas turbine engines.

The control actuator settings may be selected from the group consisting of: a fuel flow rate; a variable geometry of one or more stators and/or one or more rotors of the gas turbine engine; a variable engine size (e.g. achieved by varying an amount of an engine working fluid bypass flow); a variable nozzle area; and a variable fan pitch. In some examples, there may be at least five control actuator settings including at least all of the control actuator settings from this group. In the context of hybrid propulsion systems of the type discussed above, the control actuator settings may include e.g. one or more electrical power generator setting.

The gas turbine engines may be aircraft-mounted, i.e. they may be aircraft power plants. The gas turbine engines may be geared turbofan engines, or engine that are parts of hybrid propulsion systems.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m.

The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures. In the drawings.

DETAILED DESCRIPTION OF THE DISCLOSURE

Embodiments will now be described by way of example only, with reference to the

Figure 1:
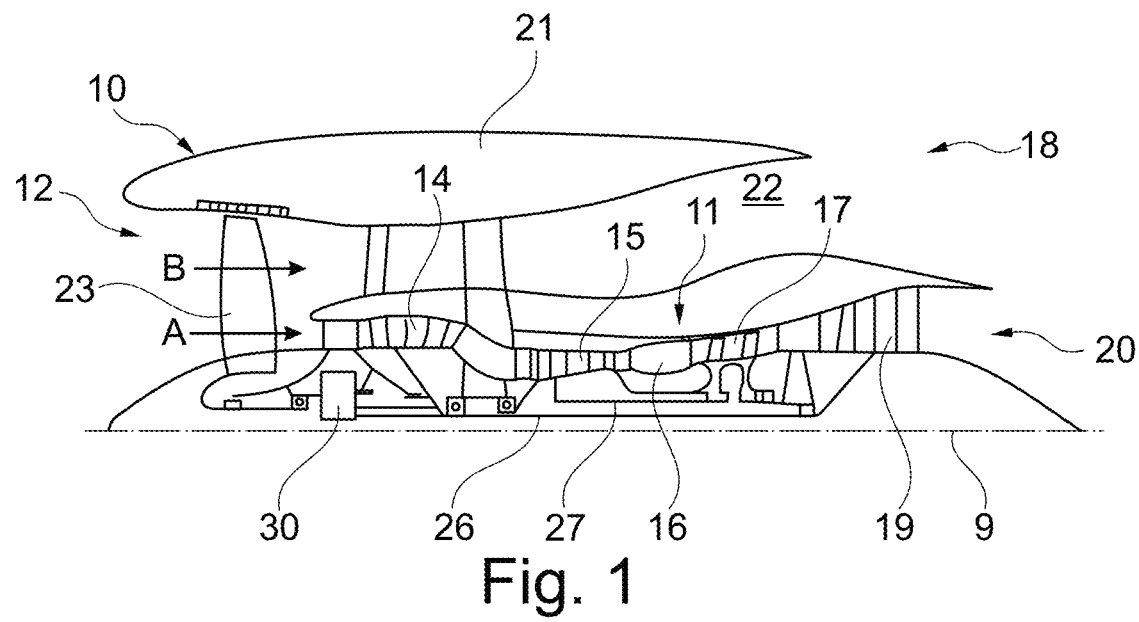
FIG. 1 is a sectional side view of a gas turbine engine.

Figures, in which:

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
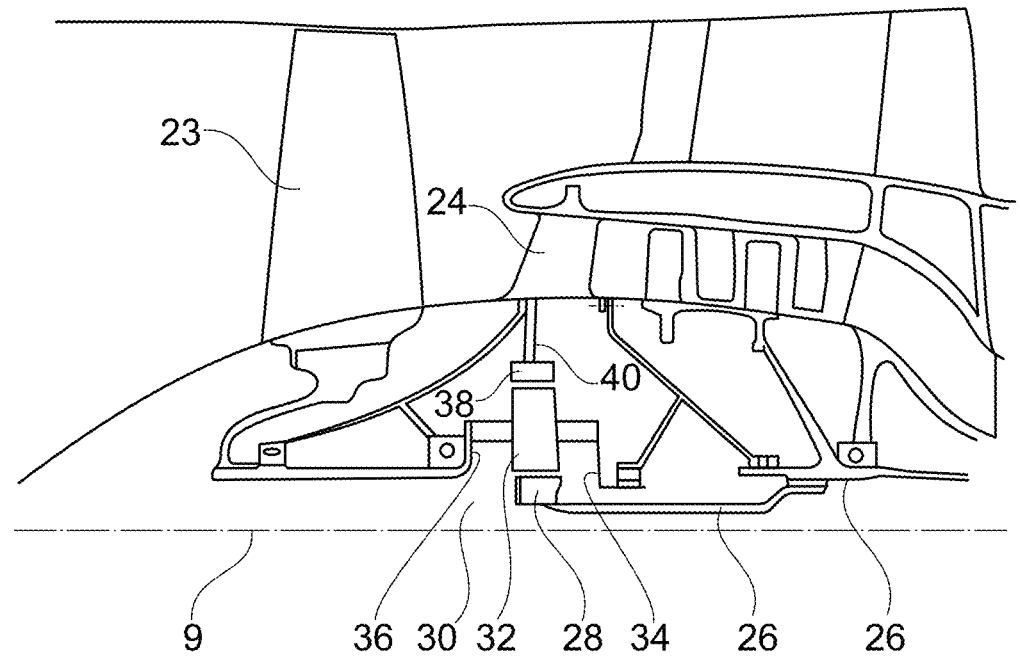
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
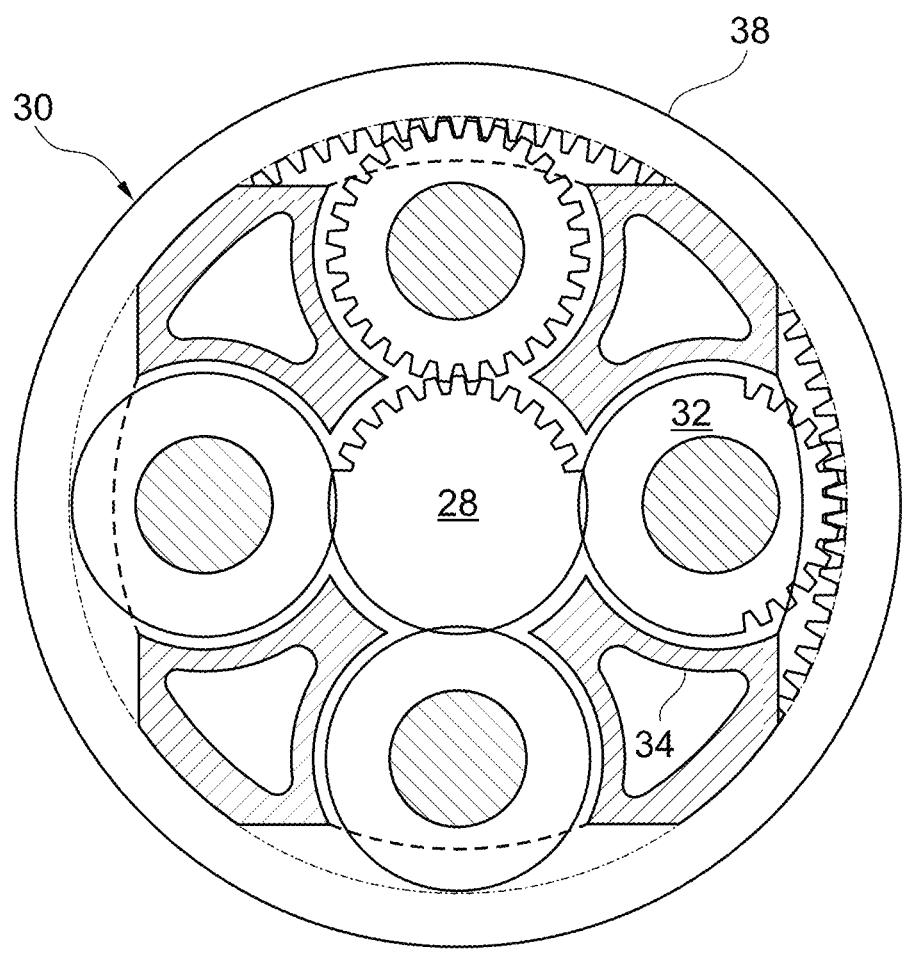
FIG. 3 is a partially cut-away view of a gearbox for a gas turbine engine.

The epicyclic gearbox 30 is shown by way of example in greater detail in FIG. 3.

Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
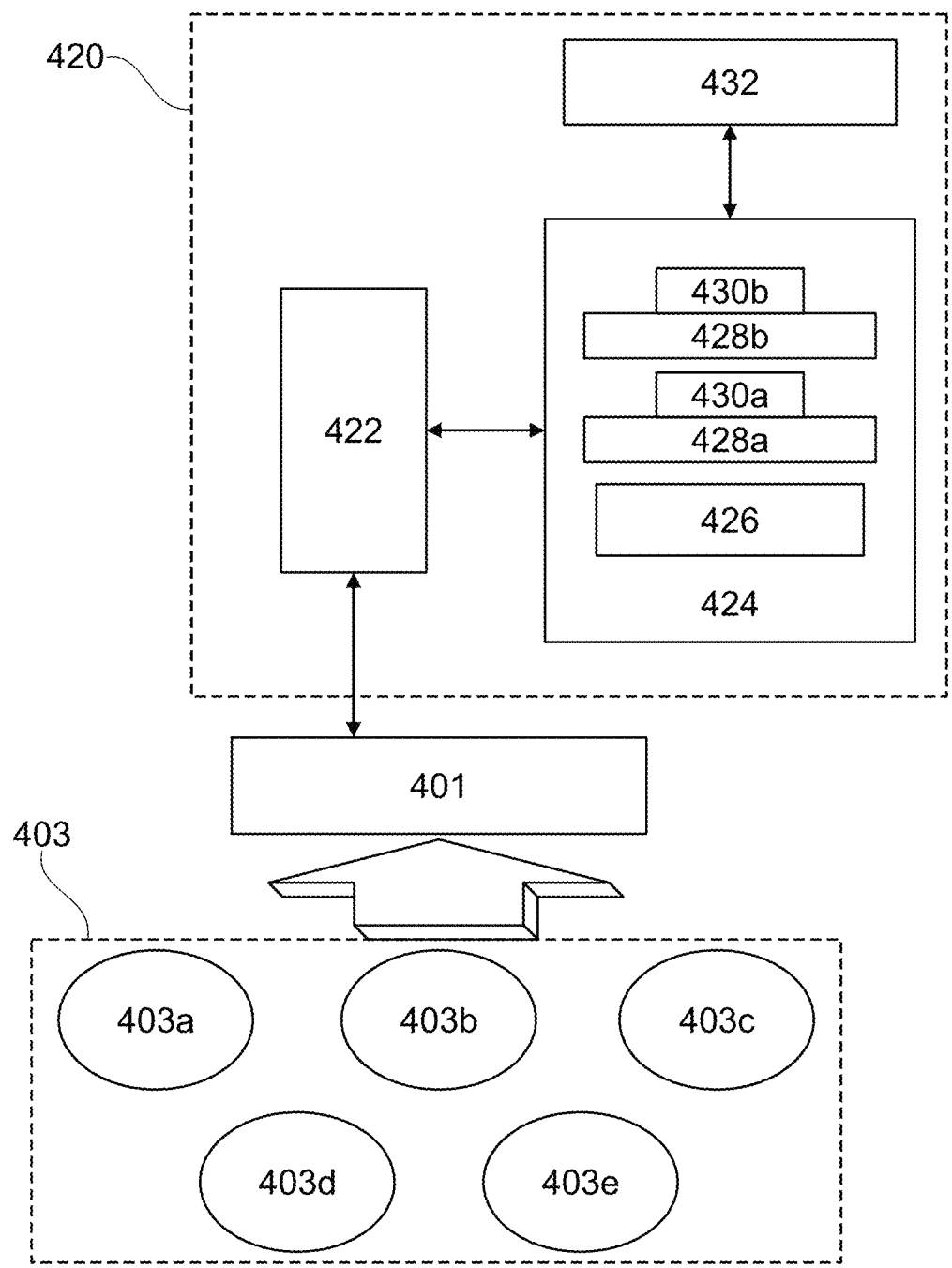
FIG. 4 is a schematic of a system according to the present disclosure.

FIG. 4 shows a schematic of a system according to the present disclosure. The system comprises two main components: fleet management computer 401, and engine management systems 420 (a single example of engine management system being shown in FIG. 4). Each engine management system 420 comprises a power management component 422, which communicates, typically wirelessly, with fleet management computer 401 to thereby exchange, for example, control performance and/or trim preference signals as well as power system status and performance data. The fleet management computer may be ground based, whereas the engine management systems may be vehicle based (i.e. contained within the vehicles, typically aircraft, which contain managed engines). In particular, the managed engines can be geared turbofan engines, as described above in respect of FIGS. 1 to 3. The fleet management computer 401 may be a system of linked computers, e.g. in the form of a cloud-based computer service. The power management component 422 communicates with integrated power system 424, which manages gas turbines 428a and 428b via engine electronic control units 430a and 430b respectively. The power management component and integrated power system communicate so as to exchange, for example, control actuator settings (e.g. a fuel flow rate, a variable geometry of one or more stators and/or one or more rotors of the engine, a variable engine size, a variable nozzle area, a variable fan pitch), trim signals for varying these settings, engine state parameters (e.g. engine pressures, engine temperatures, engine shaft rotational speeds), and other status/feedback data. Integrated power system 424 also manages energy storage and/or auxiliary power unit 426. The integrated power system 424 is also in communication with flight management and control system 432 and exchanges, for example, power requirement and status/advisories data.

Therefore, the fleet management computer 401 receives from each power management component 422 data indicative of the performance and configuration of the gas turbines 428a and 428b managed by that power management component. The fleet management computer 401 also receives data 403 external to the operation of the gas turbines engines. This data can be for example: 403a—web service data, e.g. news or share indexes which may be indicative of the availability or cost of components or consumables for the gas turbine engines; 403b—service commercial contract data, indicative of the availability or costing of service personnel; 403c—data indicative of flight logistics for the aircraft containing the gas turbine engines; 403d—maintained centre forecasting data, indicative of when gas turbines in the system may require maintenance; and 403e—operations centre data.

The engine systems are initially operated with their respective standard (or default) settings across the range of their control actuator settings. An external, i.e. to the engine management systems 420, change may then occur. This change may be, for example, changes to forward oil price, changes to interest rates, unavailability of skilled maintenance labour, and/or change in the use of the aircraft. This change is detected automatically by fleet management computer 401. The change is then analysed by the fleet management computer 401, and a desired performance modification of the engine systems is derived by the fleet manager. The analysis may be performed via machine learning or artificial intelligence techniques. The desired performance modification may be articulated as updating a preference weighting of the gas turbines. For example, a greater preference may be given to decreasing fuel consumption or lengthening the time between maintenance of the gas turbine engines at the expense of increased consumption of oil or other consumables.

As an example, the fleet management computer 401 may receive a signal indicating that a maintenance service centre is under a high load. The fleet management computer may respond by deriving and transmitting a performance modification to one or more engine management systems 420 which aims to stagger the time at which the fleet of gas turbines will require maintenance. This derivation may be informed by, for example, the present condition of the gas turbine engines and the expected duty cycle (e.g. route) of each aircraft.

Using the measured current control actuator settings of the engines, the performance modification is then translated (either by the fleet management computer 401 or by the power management components 422 of the engine management systems 420) into trim signals for varying one or more selected of the control actuator settings. These trim signals are then communicated to the engine electronic control units 430a and 430b and implemented in the engines.

The performance of each gas turbine engine is monitored, and an indication of the performance and status of the gas turbine engine is provided to the respective power management component 422. The power management components in turn provide this as feedback to the fleet management computer 401. The fleet management computer 401 thereby monitors the overall performance of the fleet and makes adjustments to the fleet's articulated preference weightings as appropriate.

For instance, in the example discussed above, if a particular gas turbine engine is expected to reach its maintenance slot too early (and this cannot be prevented), then one or more other engines' control actuator settings can be modified to accommodate this by operating those engines in such a manner as to delay their need for maintenance.

The system can operate continuously and essentially automatically. It can continuously analyse information and data sources, and translate these external factors into changes to the articulated preference weightings.

Figure 5:
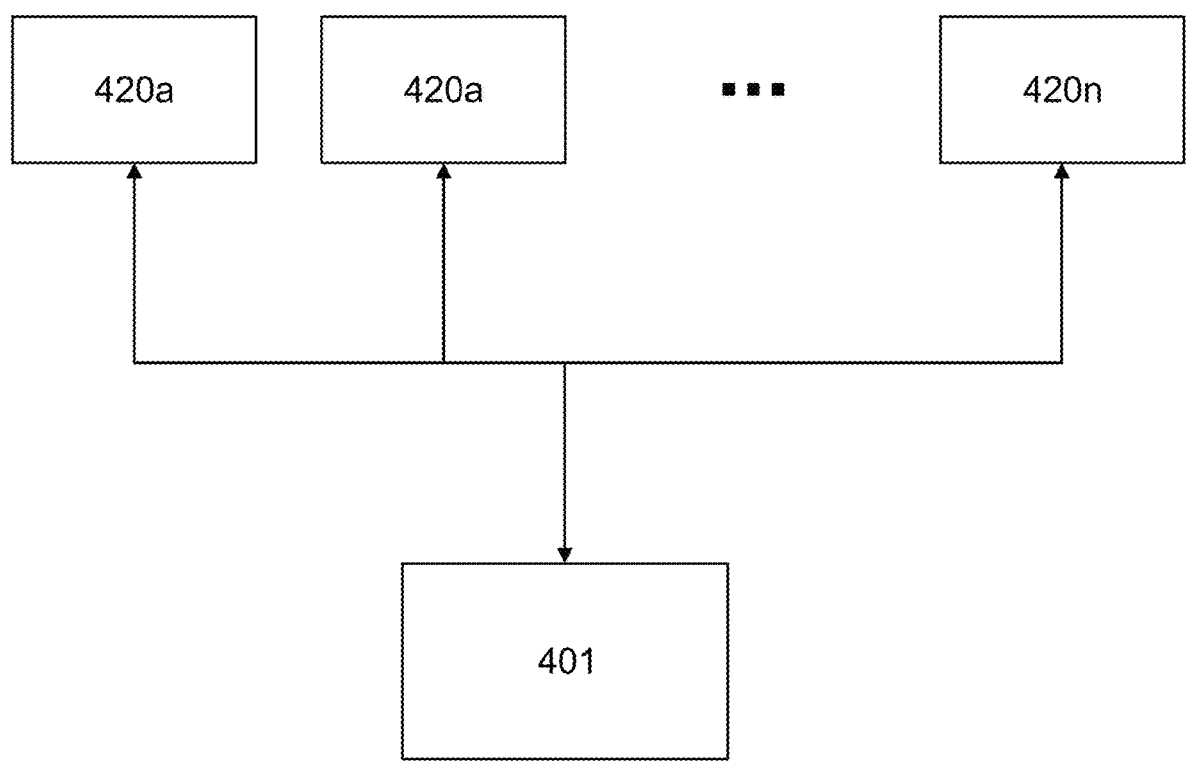
FIG. 5 is a schematic of a network incorporating the system of FIG. 4.

FIG. 5 shows a schematic of a network incorporating the system shown in FIG. 4. The fleet management computer 401 is connected to plural engine management systems 420a, 420b . . . 420n. Each engine management system 420 is communicatively connected to the fleet management computer 401, and so can exchange data therebetween.

Figure 6:
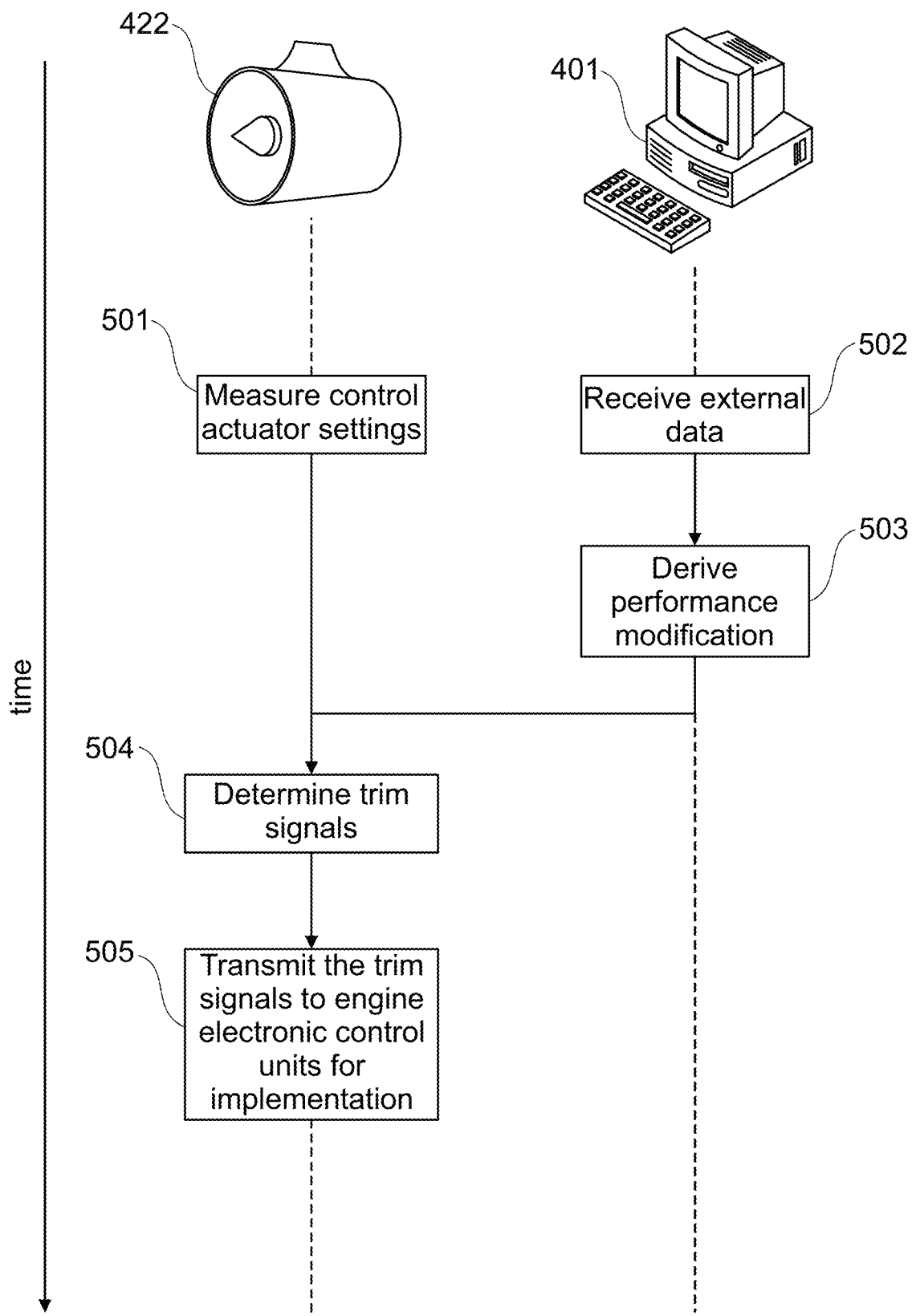
FIG. 6 is a network flow diagram illustrating a method according to the present disclosure.

FIG. 6 is a network flow diagram illustrating a method according to the present disclosure. A power management component 422, of the plurality of engine management systems 420, is in communication with the fleet management computer 401, and measures plural control actuator settings in step 501.

In step 502, the fleet management computer 401 receives external data. This external data is as-yet unrelated to the operation of the fleet gas turbine engines to which the fleet management computer is connected. Examples of the external data have been given previously.

After receiving the external data, the fleet management computer 401 derives a desired performance modification of the gas turbine engines. This is shown in step 503. The derivation may also take into account the current values of one or more control variables of the plurality of gas turbine engines.

After deriving this performance modification, one or more trim signals for respectively varying selected of the control actuator settings of the engines to achieve the desired performance modification are determined. This determination is based on the measured control actuator settings, and may also take into account the current values of one or more engine state parameters of the gas turbine engines. The determination may be performed by the fleet management computer 401 and then communicated to the power management components 422 or, as shown in step 504 of FIG. 6, the determination may be performed by each power management component after it receives the performance modification from the fleet management computer. Thereafter, as shown in step 507, the power management component transmits the trim signals to its electronic control units for implementation by the gas turbine engines.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of optimizing the operation of a fleet of gas turbine engines, the method comprising the steps of:
   (a) measuring respective values for plural control actuator settings within each of the gas turbine engines;
   (b) deriving, based on data external to the operation of the gas turbine engines, a desired performance modification of the gas turbine engines;
   (c) determining, based on the measured control actuator settings, one or more trim signals for respectively varying selected of the control actuator settings to achieve the desired performance modification; and
   (d) transmitting the trim signals to respective electronic controllers of the engines to vary the selected control actuator settings accordingly.

2. The method of claim 1, wherein respective values of three or more control actuator settings are measured within each of the gas turbine engines.

3. The method of claim 1, wherein the step of determining the one or more trim signals is further based on current values of one or more engine state parameters of one or more of the gas turbine engines.

4. The method of claim 1, wherein the data external to the operation of the gas turbine engines include data indicative of at least one of: a flight logistics plan for an aircraft including at least one of the gas turbine engines; an availability of service personnel; a service interval time of at least one of the gas turbine engines; and an availability of consumables for the fleet of gas turbine engines.

5. The method of claim 1, wherein the control actuator settings are selected from the group consisting of: a fuel flow rate; a variable geometry of one or more stators and/or one or more rotors of the gas turbine engine; a variable engine size; a variable nozzle area; and a variable fan pitch.

6. The method of claim 1, wherein the gas turbine engines are geared turbofan engines.

7. A system for optimizing the operation of a fleet of gas turbine engines, the system comprising:
   plural power managers local to and connected to the gas turbine engines, and configured to measure values for plural control actuator settings within each of the gas turbine engines; and
   a remote, fleet management computer system in communication with each of the power managers, and configured to derive, based on data external to the operation of the gas turbine engines, a desired performance modification of the gas turbine engines;
   wherein either the power managers are further configured to determine or the fleet management computer system is further configured to determine, based on the measured control actuator settings, one or more trim signals for respectively varying selected of the control actuator settings to achieve the desired performance modification; and
   wherein the power managers are further configured to transmit the trim signals to respective electronic controllers of the engines to vary the selected control actuator settings accordingly.

8. The system of claim 7, wherein respective values of three or more control actuator settings are measured within each of the gas turbine engines.

9. The system of claim 7, wherein one or more of the power managers are further configured to measure current values of one or more engine state parameters of one or more of the gas turbine engines, and the determination of the one or more trim signals is further based on the measured current values of the engine state parameters.

10. The system of claim 7, wherein the data external to the operation of the gas turbine engines include data indicative of at least one of: a flight logistics plan for an aircraft including at least one of the gas turbine engines; an availability of service personnel; an availability of maintenance equipment; a service interval time of at least one of the gas turbine engines; and an availability of consumables for the fleet of gas turbine engines.

11. The system of claim 7, wherein the control actuator settings are selected from the group consisting of: a fuel flow rate; a variable geometry of one or more stators and/or one or more rotors of the gas turbine engine; a variable engine size; a variable nozzle area; and a variable fan pitch.

12. The system of claim 8, wherein the gas turbine engines are geared turbofan engines.

13. A non-transitory computer program comprising code for optimizing the operation of a fleet of gas turbine engines, the code, when run on a computer, causing the computer to perform a method comprising the steps of:
  (a) receiving respective measured values for plural control actuator settings within each of the gas turbine engines;
  (b) deriving, based on data external to the operation of the gas turbine engines, a desired performance modification of the gas turbine engines;
  (c) determining, based on the measured control actuator settings, one or more trim signals for respectively varying selected of the control actuator settings to achieve the desired performance modification; and
  (d) transmitting the trim signals to respective electronic controllers of the engines to vary the selected control actuator settings accordingly.

14. The computer program of claim 13 stored on a non-transitory computer readable medium.

\* \* \* \* \*